US010677363B2

(12) United States Patent
Cheney et al.

(10) Patent No.: US 10,677,363 B2
(45) Date of Patent: Jun. 9, 2020

(54) WATER HAMMER PREVENTION VALVE AND METHOD

(71) Applicants: Dale S. Cheney, Syracuse, UT (US); Steven L. Nichols, Heber, UT (US)

(72) Inventors: Dale S. Cheney, Syracuse, UT (US); Steven L. Nichols, Heber, UT (US)

(*) Notice: Subject to any disclaimer, the term of this patent is extended or adjusted under 35 U.S.C. 154(b) by 3 days.

(21) Appl. No.: 15/895,715

(22) Filed: Feb. 13, 2018

(65) Prior Publication Data

US 2019/0249781 A1 Aug. 15, 2019

(51) Int. Cl.
| | |
|---|---|
| *E03B 9/02* | (2006.01) |
| *F16K 3/32* | (2006.01) |
| *F16K 3/34* | (2006.01) |
| *F16K 31/53* | (2006.01) |
| *F16K 3/02* | (2006.01) |
| *F16K 47/02* | (2006.01) |
| *F16K 1/04* | (2006.01) |
| *F16K 35/04* | (2006.01) |

(52) U.S. Cl.
CPC ............... *F16K 3/32* (2013.01); *E03B 9/02* (2013.01); *F16K 1/04* (2013.01); *F16K 3/0254* (2013.01); *F16K 3/34* (2013.01); *F16K 31/53* (2013.01); *F16K 35/04* (2013.01); *F16K 47/023* (2013.01)

(58) Field of Classification Search
CPC . E03B 9/02; F16K 3/0254; F16K 3/34; F16K 31/53; F16K 47/023; Y10T 137/5438; Y10T 137/0318
USPC ............... 137/15.02; 251/248, 263, 264–278
See application file for complete search history.

(56) References Cited

U.S. PATENT DOCUMENTS

| | | | | |
|---|---|---|---|---|
| 1,402,182 A | * | 1/1922 | Schultis | E03B 9/02 137/382 |
| 1,456,697 A | * | 5/1923 | Kitts, Jr. | F16K 3/0254 251/249.5 |
| 1,784,094 A | * | 12/1930 | Fletcher | F16K 31/53 137/269 |
| 2,025,244 A | | 12/1935 | French et al. | |
| 2,674,903 A | * | 4/1954 | Doster | F16K 31/53 251/248 |

(Continued)

FOREIGN PATENT DOCUMENTS

| | | |
|---|---|---|
| JP | 59-131672 | 9/1984 |
| JP | H0396462 A | 4/1991 |

(Continued)

OTHER PUBLICATIONS

International Search Report and Written Opinion for International Application No. PCT/US2016/036085 dated Aug. 25, 2016 from the International Search Authority, Russia.

(Continued)

*Primary Examiner* — Minh Q Le
(74) *Attorney, Agent, or Firm* — Fabian VanCott; Steven L. Nichols (57) ABSTRACT

A valve for preventing water hammer includes a speed reduction device for reducing a speed at which the valve may be closed. A method of preventing water hammer includes closing a valve at a fire hydrant after extracting water from the fire hydrant, in which the valve comprising a speed reduction device that increases an amount of time needed for closing the valve, and operating the valve to close the valve comprises operating the speed reduction device.

16 Claims, 6 Drawing Sheets

(56) References Cited

U.S. PATENT DOCUMENTS

| | | | | |
|---|---|---|---|---|
| 2,881,602 | A | * | 4/1959 | Baker ................. E03B 9/02 |
| | | | | 251/81 |
| 3,506,027 | A | | 4/1970 | Dunton |
| 3,677,282 | A | | 7/1972 | Page |
| 3,727,432 | A | * | 4/1973 | Eaves ................ B23B 31/38 |
| | | | | 279/158 |
| 4,056,984 | A | * | 11/1977 | Kenealy .............. F16K 31/53 |
| | | | | 74/89.38 |
| 4,082,247 | A | | 4/1978 | Dalton |
| 4,178,816 | A | | 12/1979 | Radice |
| 4,222,246 | A | | 9/1980 | Rongley |
| 4,270,727 | A | | 6/1981 | Norman |
| 4,275,866 | A | * | 6/1981 | Jamar ................ F16K 3/0254 |
| | | | | 251/250 |
| 4,364,411 | A | | 12/1982 | Minnella |
| 4,619,437 | A | | 10/1986 | Williams |
| 4,651,772 | A | * | 3/1987 | Carlin ................ E03B 9/02 |
| | | | | 137/299 |
| 4,807,848 | A | | 2/1989 | Macomber |
| 5,074,522 | A | | 12/1991 | Reynolds et al. |
| 5,106,055 | A | | 4/1992 | Phillips |
| 5,287,880 | A | | 2/1994 | Bouc et al. |
| 5,364,066 | A | * | 11/1994 | Dorste ................ F16K 1/38 |
| | | | | 251/122 |
| 5,381,996 | A | * | 1/1995 | Arnemann ............ F16K 31/12 |
| | | | | 137/554 |
| 5,618,027 | A | | 4/1997 | Nevrekar |
| 5,791,579 | A | * | 8/1998 | Raphael ................ B66D 1/58 |
| | | | | 192/56.1 |
| 5,941,500 | A | | 4/1999 | Lebkuchner |
| 5,924,437 | A | | 7/1999 | Young |
| 5,937,890 | A | | 8/1999 | Marandi |
| 6,543,485 | B2 | | 4/2003 | Henry et al. |
| 6,672,337 | B2 | | 1/2004 | Kobayashi et al. |
| 6,776,184 | B1 | | 8/2004 | Maichel et al. |
| 7,267,136 | B2 | | 9/2007 | Fleury, Jr. et al. |
| 7,448,410 | B2 | | 11/2008 | Keiser |
| 7,516,751 | B2 | | 4/2009 | Fleury, Jr. et al. |
| 7,523,916 | B2 | * | 4/2009 | Fenton ................ F16K 3/0254 |
| | | | | 251/266 |
| 7,837,175 | B2 | | 11/2010 | Stone et al. |
| 8,353,498 | B2 | * | 1/2013 | Fukano ................ F16K 7/16 |
| | | | | 251/79 |
| 2005/0247900 | A1 | | 11/2005 | Marsh et al. |
| 2008/0061256 | A1 | | 3/2008 | Lewis et al. |
| 2008/0169441 | A1 | | 7/2008 | Beebe |
| 2008/0209963 | A1 | * | 9/2008 | Trempala .............. E03B 9/10 |
| | | | | 70/167 |
| 2008/0217569 | A1 | | 9/2008 | Holliday |
| 2008/0315139 | A1 | | 12/2008 | Stonr |
| 2011/0001076 | A1 | | 1/2011 | Sidler |
| 2011/0036421 | A1 | | 2/2011 | Minnella |
| 2011/0168265 | A1 | | 7/2011 | Cheney |
| 2011/0193003 | A1 | * | 8/2011 | Tachikawa ............ F16K 31/048 |
| | | | | 251/248 |
| 2012/0319019 | A1 | * | 12/2012 | Burgess ................ F16K 31/088 |
| | | | | 251/129.11 |
| 2014/0124209 | A1 | * | 5/2014 | Mogedal ............... F16K 3/0263 |
| | | | | 166/335 |
| 2015/0267841 | A1 | | 9/2015 | Cheney |
| 2015/0307378 | A1 | * | 10/2015 | Barrett ................ C02F 1/70 |
| | | | | 210/198.1 |
| 2015/0308583 | A1 | * | 10/2015 | Suzuki ................ F16K 31/53 |
| | | | | 74/665 A |

FOREIGN PATENT DOCUMENTS

| | | |
|---|---|---|
| JP | 2005-321011 | 11/2005 |
| SU | 830065 A1 | 5/1981 |

OTHER PUBLICATIONS

Machine Translations of JP59131672 (translated by Schrieber Translations Apr. 2012).

Machine Translations of SU830065A1 (obtained from EPO website on Nov. 14, 2016).

International Search Report and Written Opinion for International Application No. PCT/2019/017467 dated Apr. 2, 2019 from the International Search Authority, Russia.

* cited by examiner

Fig. 6

WATER HAMMER PREVENTION VALVE AND METHOD

BACKGROUND

Fire hydrants are provided at various points on major water systems as an access to the water in the system. Fire hydrants are so named because they are frequently used to access water for fighting fires. However, fire hydrants are also commonly used to access water for other purposes, most notably, construction and irrigation.

Consequently, a wide variety of personnel with different levels of training regarding water systems may be using a fire hydrant to get water for a variety of purposes. In many non-emergency situations, the hydrant may be connected by hose to a water truck that is then filled with water from the hydrant for transportation to a construction site or other location where the water is needed.

The water in a major water system and available at a fire hydrant is typically under high pressure. This water pressure, if not handled properly, can cause significant damage to the fire hydrant, the water system infrastructure and/or surrounding property. Therefore, it is important that personnel using a fire hydrant, regardless of their level of training, do so properly.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The following specification describes a novel valve and associated methods for making such a valve and for using the valve with a fire hydrant, where the valve limits the speed with which a hydrant user can close the valve. This generally avoids a problem known as water hammer that will be described below and which is responsible for much of the damage possible when misusing a fire hydrant.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used herein and in the appended claims, the term water-hammer or fluid-hammer are used interchangeably to refer to the effect of closing a valve too quickly through which fluid, usually under pressure, is flowing, causing the fluid to hammer against the closed valve and/or other upstream portions of the system. Thus, the term water-hammer may be used even if the fluid in question is something other than water.

Figure 1:
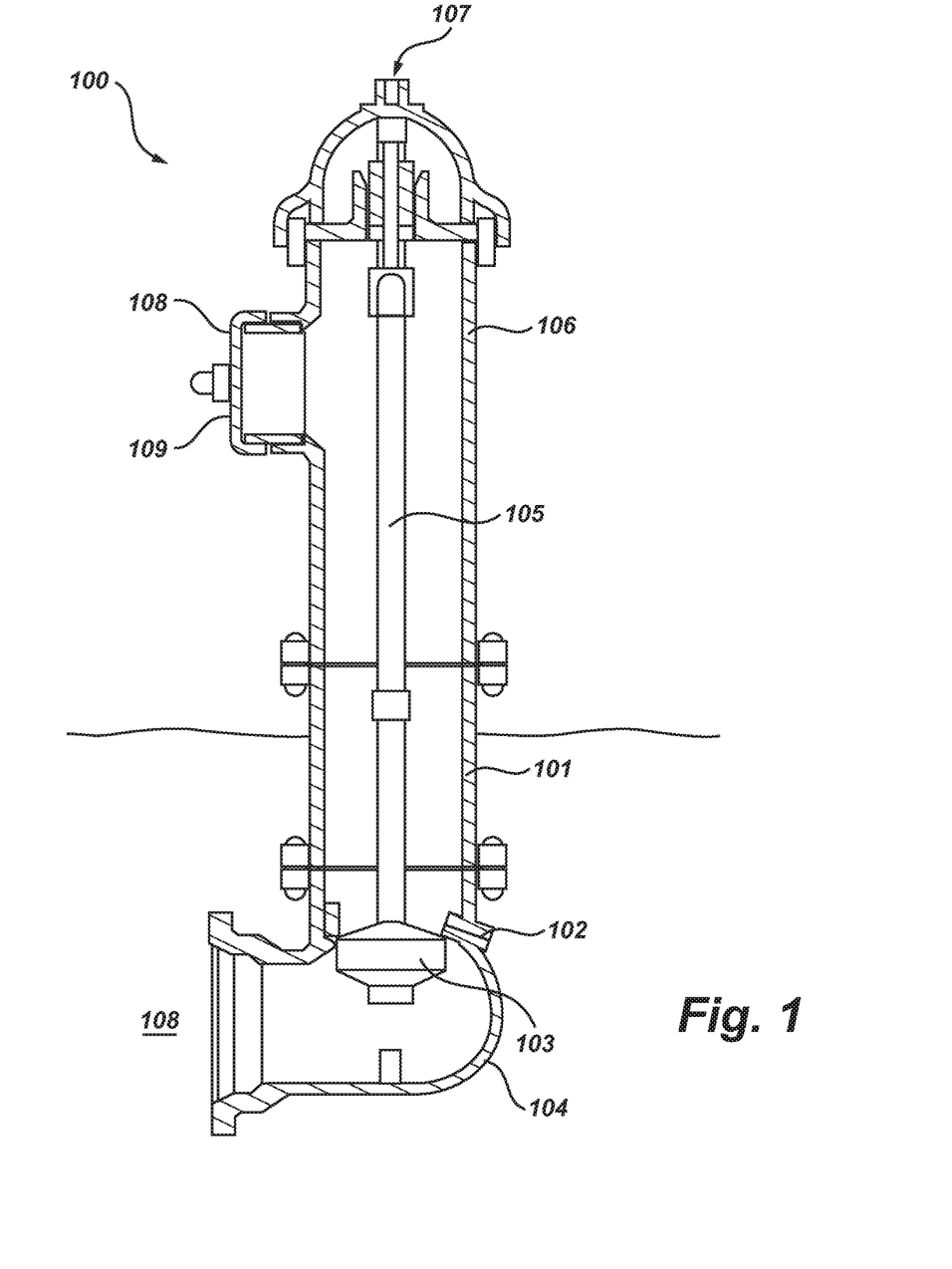
FIG. 1 is a cross-sectional view of a fire hydrant with which the principles described herein may be practiced.

FIG. 1 illustrates the interior of a fire hydrant (100). As shown in FIG. 1, the fire hydrant (100) includes a lower standpipe (101) that extends from above the surface into the ground. At the bottom of the lower standpipe (101) a drain (102) that connects the lower standpipe with an elbow (104). The elbow (104) is connected to the water system (108) serviced by the first hydrant (100).

The drain (102) includes a main hydrant valve (103) that can be opened to allow water from the water system (108) into the hydrant (100). As noted above, this water will typically be at a high pressure. The main hydrant valve (103) is operated by turning a valve stem (105).

The lower standpipe (101) is topped by a barrel (106) which is the main body of the hydrant above ground. The barrel includes at least one, typically two and sometimes three, pumper nozzles (108) from which water is extracted from the hydrant (100). At the end of each nozzle (108), threads are provided by which a valve or hose can be attached to the nozzle (108). Each nozzle (108) is usually covered by a protective cap (109) when not in use.

The valve stem (105) extends from the main hydrant valve (103) through the lower standpipe (101) and barrel (106) to connect to an operating nut (107) at the top of the hydrant (100). This operating nut (107) is turned to drive the valve stem (105) so as to either open or close the main hydrant valve (103) at the drain (102).

The typical operation of a fire hydrant for non-emergency purposes might be as follows. Prior to opening the main hydrant valve (103), the protective cap (109) is removed from a nozzle (108) and a separate valve is attached to the nozzle (108). That valve may, in turn, be connected to a hose that feeds the tank of a water truck. With this valve in place on the nozzle (108) and closed, the operating nut (107) is driven to open the main hydrant valve (103) and charge the hydrant (100) with water. Water is then extracted from the hydrant (100) by opening and closing the valve on the nozzle (108).

A common misuse of a fire hydrant occurs when closing either the valve on the nozzle or the main hydrant valve (103). Because the water in the hydrant (100) is at such high pressure, if the flow is interrupted too quickly, damage can result. Thus if any valve in the system is closed too quickly when water is flowing, a phenomenon known as water hammer may result.

Water hammer is described as follows. When a valve on the hydrant (100) is closed relatively quickly, the momentum of the flowing water hits the now-closed valve with enough force to rebound in the opposite direction back into the water system. This rebounding volume of water will momentarily counter the pressure and flow of water still upstream in the system. However, the pressure in the system will eventually overcome the motion of the water rebounding from the closed valve and will again slam that water against the closed valve. That volume of water then rebounds, again, from against the closed valve and the process repeats itself multiple times. This repeated slamming of a volume of water against the closed valve is why the problem is referred to as water hammer.

Water hammer can produce water pressures many multiples in excess of the standard pressure in the water system. For example, if the water system has a static pressure of 100 lbs. per square inch, a water hammer may produce pressures as great as eight or nine times this pressure. Given this high level pressure involved, water hammer can easily cause damage to the water system infrastructure, such as the water main feeding the hydrant, the hydrant (100) itself, or any equipment connected to the hydrant (100). Additionally, if the water hammer damages the water system, the hydrant or any of its connections enough to cause a leak, there may be significant water damage to surrounding property as well as the inconvenience of having to shut off at least a portion of the water system for repairs.

Water hammer and its associated problems are generally avoided if care is taken to close any valve at the hydrant (100) relatively slowly. If the valve, either the main hydrant valve (103) or a valve at the hydrant pumper nozzle (108), is closed slowly enough, the flow of water is gradually diminished and never strikes the closed or closing valve with enough force to rebound back into the oncoming flow of water thereby initiating a water hammer.

While simple in theory, it is a routine and long-standing problem in the operation of all water systems that valves at fire hydrants get closed too abruptly and water hammer damage results. Untrained personnel who may be in a hurry for any number of reasons may close off a hydrant valve too quickly without being aware of the dangers involved. Additionally, even highly-trained water system personnel may sometimes, when in a hurry or concerned with other issues, close a hydrant valve too quickly and initiate a water hammer.

Water hammer is of more particular concern with regard to a valve connected to a pumper nozzle (108). This is true because such valves are usually designed to be closed quickly, if desired, and are usually operated by personnel with little or no water system training.

In light of these issues, the present specification describes a novel valve and an associated method for use with a fire hydrant that limits the speed with which a hydrant user can close the valve. This will generally prevent the unwanted initiation of a water hammer and any consequent damage to the system or surrounding property. As will be appreciated, however, by those skilled in the art, the principles described herein may also be integrated into a fire hydrant design as well as being implemented in a separate valve for connection to a fire hydrant nozzle.

Figure 2:
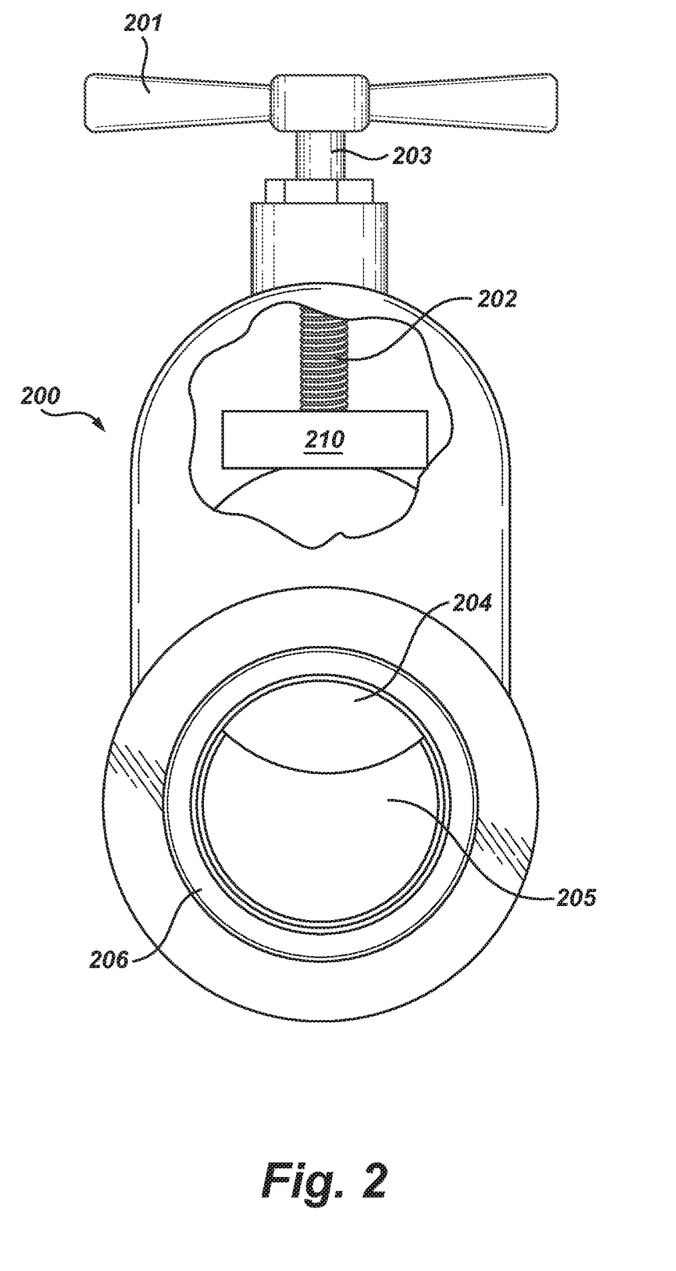
FIG. 2 is an illustration of a valve for use with a fire hydrant according to principles described herein.

FIG. 2 illustrates a hydrant valve, according to principles disclosed herein, that prevents the dangers of water hammer. The valve (200) shown in FIG. 2 may be configured for attachment to the pumper nozzle (108, FIG. 1) of a fire hydrant (100, FIG. 1) to regulate the flow of water from the hydrant.

For this purpose, a channel (205) through the valve (200) has threads (206) on either end. One such set of threads (206) may be sized for mating with the threads on a pumper nozzle (108, FIG. 1) of a fire hydrant (100, FIG. 1) so that the valve (200) can be mounted on and regulate water flow from the nozzle (108, FIG. 1). The threads on the other side of the channel (205) may be used to attach a hose to the valve (200). As described above, such a hose may be used to connect the hydrant to a water truck.

The valve illustrated in FIG. 2 is gate valve. However, it will be understood by those skilled in the art that the principles described herein could be implemented with other types of valves including a butterfly or ball valve. As used herein and in the appended claims, the term "closure mechanism" will refer to the mechanism in each valve the closes the valve, for example, a gate and worm gear in a gate valve, the butterfly member in a butterfly valve or the ball in a ball valve.

As shown in FIG. 2, the flow of water through the channel (205) of the valve (200) is regulated by the gate (204) which moves in and out of the channel (205) to limit or block the flow of water through the valve (200). The gate (204) is raised and lowered, extended and withdrawn, in and out of the channel (205) by operation of the valve handle (201).

The valve handle (201) is rotated to turn a shaft (203). The shaft (203) is connected to, or includes, a screw (202) that acts as a worm gear to move the gate (204) in and out of the channel (204).

In a typical valve, the handle (201) is designed for easy and, therefore, quick operation. Consequently, the gate (204) could be lowered and the valve (200) completed shut in a relatively short amount of time. As described above, this can result in water hammer. However, in the illustrated valve (200), a speed reduction device (210) is interposed between the operation of the handle (201) and the gate (204) to limit the speed with which the valve can be closed.

This speed reduction device (210) may be provided according to any of several embodiments which will be described below. Two or more of these embodiments may also be used together in the same valve (200) to constitute the speed reduction device (210).

Figure 3:
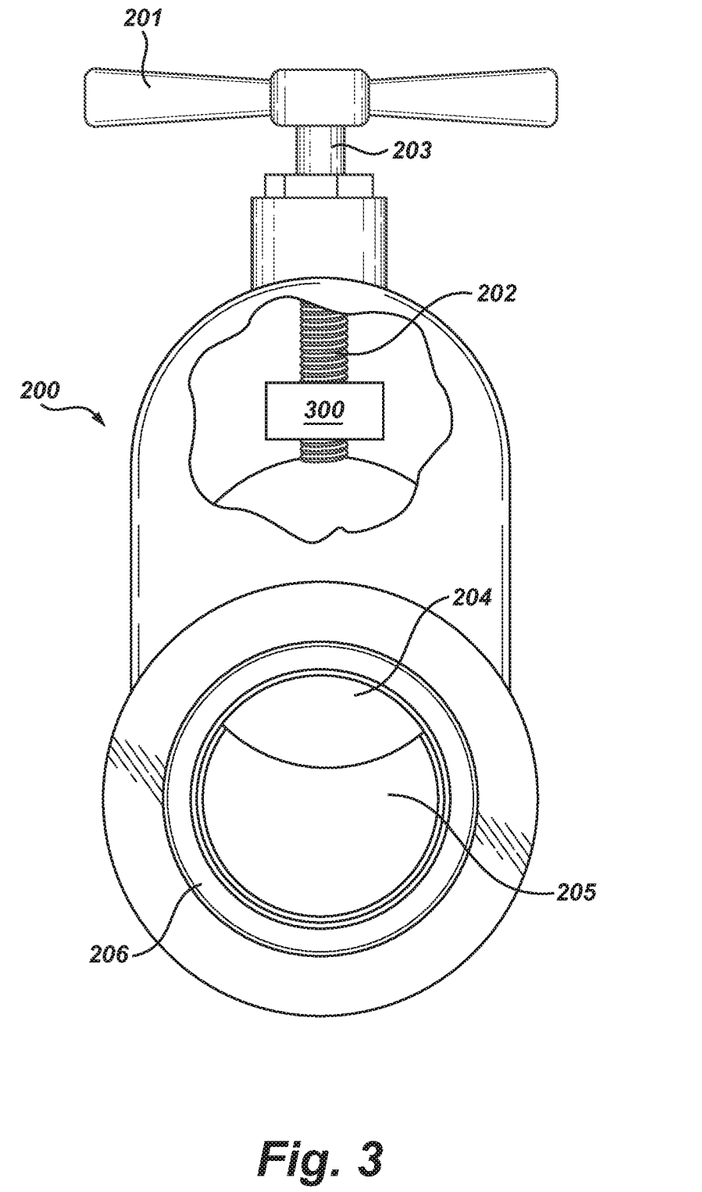
FIG. 3 is an illustration of one particular embodiment of the valve shown in FIG. 2.

As shown in FIG. 3, a gear train (300) may be interposed between the handle (201) and the gate (204) so as to limit the speed with which the gate (204) can be closed. The gear train (300) may comprise two or more gears that are driven by the rotation of the handle (201) and, in turn, translate the gate (204) between its open and closed positions. The gears of the train (300) have a gear ratio such that a larger number of turns of the handle (201) are required to close the gate (204) than would be the case without the gear train (300). Consequently, even if the handle (201) is turned very rapidly by an imprudent operator, the gate (204) will move more slowly to close.

Figure 4:
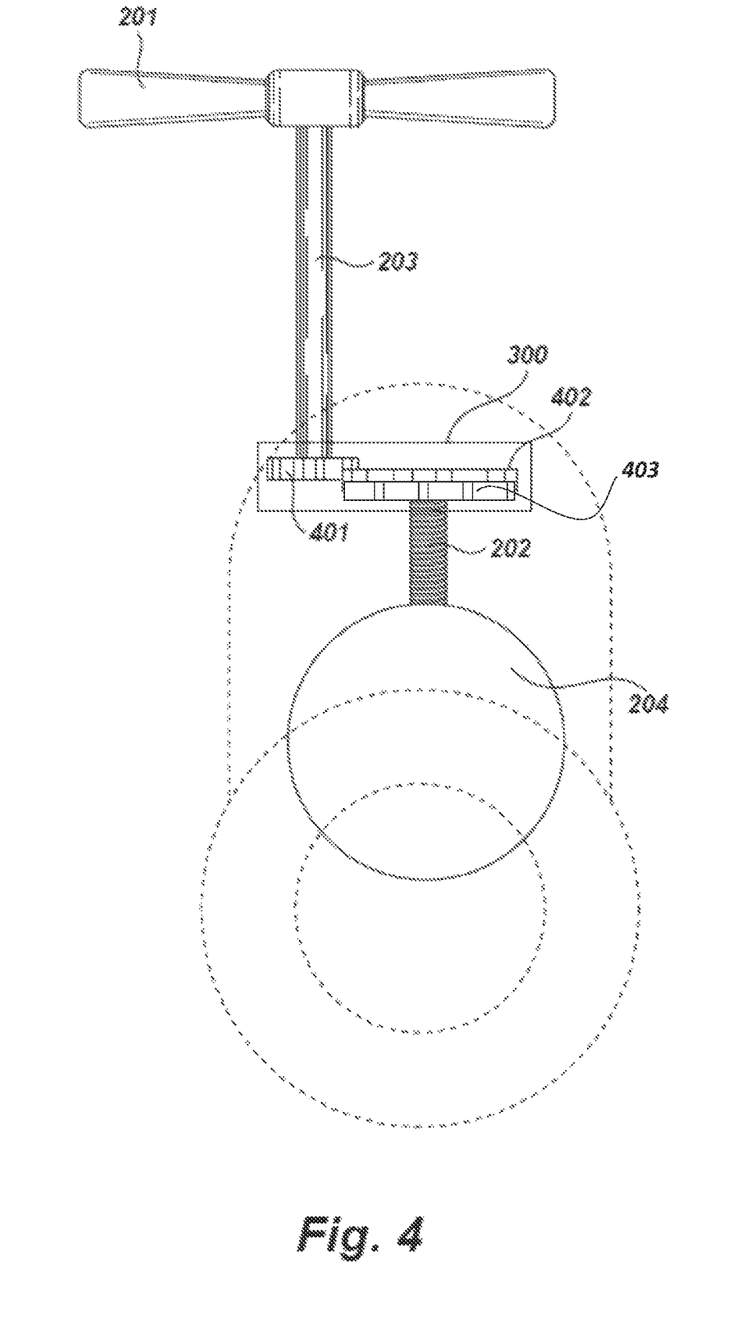
FIG. 4 is a further illustration of the gear train illustrated in the valve of FIG. 3.

A specific example of the gear train (300) is illustrated in FIG. 4. As shown in FIG. 4, for example, the gear train (300) comprises three gears (401, 402 and 403). The handle (201) of the valve is used to turn the shaft (203) which, in turn, rotates a small gear (401). This small gear (401) is meshed with and drives a significantly larger gear (402). The larger gear (402) drives a third gear (403), which in turn, drives the screw (202) or worm gear, described above. It is the screw (202) that actually translates the gate (204) of the valve into and out of the channel.

Because of the difference in size, the gear ratio, between the first two gears (401 and 402), it will take multiple complete turns of the handle (201) to rotate the gears enough to rotate the screw (202) through a single turn. This can be explained further as follows. Absent the gear train, each complete revolution of the handle produces one complete revolution of the screw (202) and consequent lateral translation of the gate (204). With the gear train (300) in place, each complete revolution of the handle (201) produces a complete revolution of the small gear (401), but only a fraction of a revolution of the larger gear (402) which is driving the third gear (403). Thus, the handle (201) and the small gear (401) must be completely rotated some number of times greater than one in order to produce one single revolution of the larger gear (402). It will be appreciated by those skilled in the art that the relative sizes of the gears (401, 402, 403) can be varied and selected depending on how many turns of the handle (201) are desired to result in one complete turn of the screw (202).

By thus multiplying the number of turns required of the handle (201) in order to turn the screw (202) and translate the gate (204), the valve necessarily requires more time to open or close, even if the handle (201) is being turned quickly. The gear ratio of the gear train (300) can be chosen to prevent even the fastest expected rotation of the handle (201) from translating into movement of the gate (204) quickly enough to cause water hammer. As a result, the gear train (300) necessarily prevents an impudent operator from initiating a water hammer.

Almost universally, the threads on screws and valves are set such that a rightward or clockwise rotation closes the valve or drives the screw where as a leftward or counter-clockwise rotation opens the valve to extracts the screw. Hence, the common maxim, "righty tighty, lefty loosey."

However, because of the first two gears in the gear train (300), the rotation of the handle (201) and the gear (401) will be reversed by the gear (402) in driving the screw (202). This will result in an operation contrary to what would nominally be expected, i.e., that a rightward or clockwise rotation will open the valve and a leftward or counter-clockwise rotation will close the valve.

This is resolved by the third gear (403) which again reverses the direction of rotation when driving the screw (202). The result is that the change in rotation direction caused by the first two gears (401, 402) of the gear train (300) is reversed by the third gear (403) such that a rightward or clockwise rotation of the handle (201) will close the gate (204) and a leftward or counter-clockwise rotation of the handle (201) will open the gate (204).

In the illustrated example, the first gear (401) is the smallest of the gears. The second gear (402) is significantly larger, creating the ratio that increases the number of turns of the handle (201) needed to close the valve. The third gear (403) is the same or nearly the same size as the second gear (402). Thus, gear ratio between the second and third gears may be 1:1 or close to 1:1. In this example, the third gear primarily (403) reverses the direction of rotation from the second gear (402) to the screw (202).

However, this is merely one example. Various ratios among the three gears may be used in different designs. In another example, the second and third gears may be progressively larger than the previous gear in the train so that the desired slowing effect between the handle and the screw is contributed to by both the second and third gears.

Figure 5A:
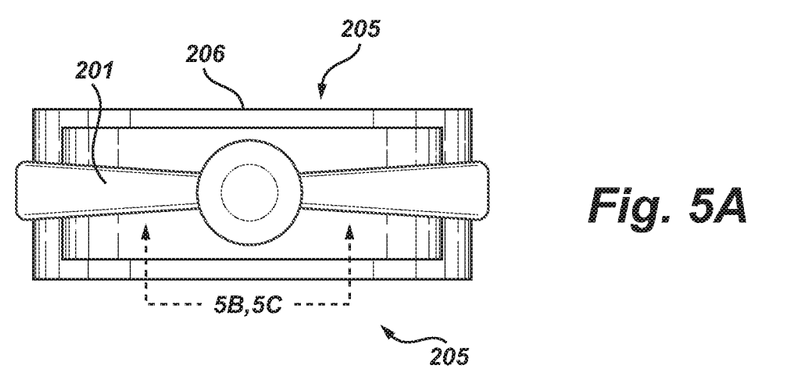
FIG. 5A is an illustration of a top view looking down on a valve according to another embodiment of the valve of FIG. 2 and the principles described herein.
Figure 5B:
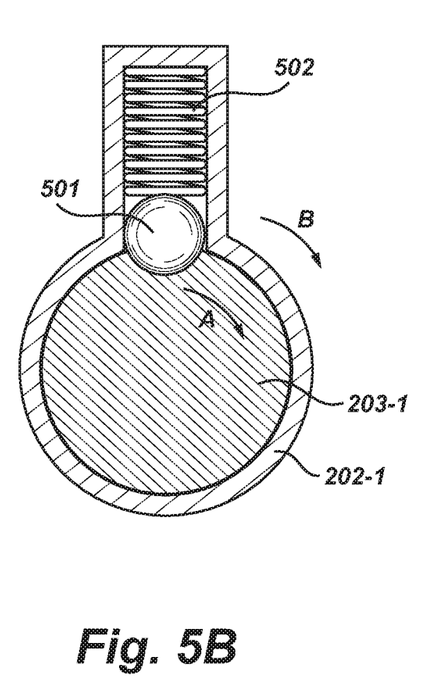
FIGS. 5B and 5C are illustrations of cross-sectional views of the valve shown in FIG. 5A.
Figure 5C:
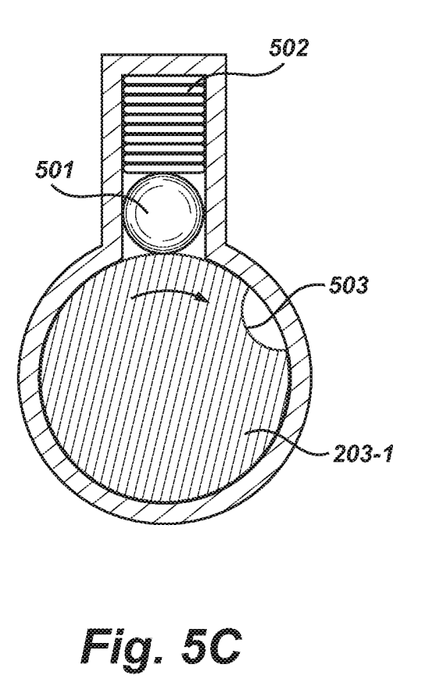

FIG. 5 illustrates another embodiment of the speed reduction device (210). As described here, FIG. 5 includes cross sectional views of an interface between the shaft (203) and the screw (202) of the valve as described above with respect to FIG. 2. As shown in FIG. 5, the speed reduction device (210) may take the form of a torque control.

FIG. 5A shows a top view of a novel valve 200 as it would appear looking down toward the valve handle (201). The cross-sectional views described below and shown in FIGS. 5B and 5C are taken along the line in FIG. 5A labeled "5B, 5C."

Referring to FIGS. 5B and 5C, in this embodiment, the shaft (203-1), extending from the handle of the valve, is received in a hollow portion of the screw (202-1). As described above, rotation of the screw (202-1) translates the gate or other closure mechanism of the valve.

In order for the shaft (203-1), which is turned by the handle (201, FIG. 2), to drive the screw (202-1) and operate the valve (200, FIG. 2), the shaft (203-1) must be coupled to the screw (202-1). This coupling is made by a bearing (501) that is biased into a receiving notch (503) of the shaft (203-1).

As shown in FIG. 5A, the bearing (501) and a biasing member (502), such as a spring, are part of the screw (202-1). Consequently, the shaft (203-1) and screw (202-1) are coupled when the bearing (501) is forced by a bias, such as a spring (502), into the receiving notch (503) of the shaft (203-1). When this is the case, rotation of the shaft (203-1), as indicated by arrow A, will also result in rotation of the screw (202-1), as indicate by arrow B. Thus, the shaft (203-1) can be used to drive the screw (202-1) and thereby close the valve (200, FIG. 2).

However, if too much torque is applied to the shaft (203-1), which may occur if an imprudent operator is attempting to close the valve too quickly, the bias of the spring (502) will be overcome thereby allowing the bearing (501) to move out of the receiving notch (503) in the shaft (203-1). This state is illustrated in FIG. 5B.

When the bearing (501) is no longer in the receiving notch (503), there is no coupling between the shaft (203-1) and the screw (202-1). Consequently, the shaft (203-1) rotates within the hollow portion of the screw (202-1) without turning e screw (202-1). This continues until the shaft (203-1) has been rotated to where the bearing (501) can again be received in the receiving notch (503) of the shaft (203-1). The shaft (203-1) and screw (202-1) are then re-coupled, according to the configuration of FIG. 5A, and the shaft (203-1) can again be used to drive the screw (202-1), unless too much torque is again applied to the shaft (203-1) thereby breaking the coupling between shaft (203-1) and screw (202-1), as shown in FIG. 5B.

In this way, the shaft (202-1) can only be used to drive the screw (203-1) and operate the valve if the torque used to rotate the shaft (202-1) remains below a certain level. The strength or spring constant of the biasing member (502) can be chosen such that the coupling between the shaft (202-1) and screw (203-1) will remain engaged so long as the valve is only operated at a sufficiently slow speed and torque so as to reduce or eliminate the dangers of water hammer. If an imprudent operator attempts to apply more torque and close the valve more quickly, the coupling between the shaft (202-1) and screw (203-1) will be broken and the valve will not move toward closure until the coupling is restored and maintained by slower, more gentle rotation of the shaft (202-1).

The valves described herein (e.g., FIG. 2) may be embodied as separate valves that are selectively attached to the nozzles of a fire hydrant. Alternatively, the valves described herein may be integrated into the pumper nozzles of a fire hydrant. The principles and mechanisms described herein may also be used to control how quickly the main valve (103, FIG. 1) of the hydrant (100, FIG. 1) can be closed.

In any of the valves described herein, an indicator may also be added to the valve that shows a valve operator the relative open/closed position of the valve. Consequently, even though the vale may be opening or closing more slowly than expected, the progress in opening or closing the valve is shown to the operator by the indicator.

Figure 6:
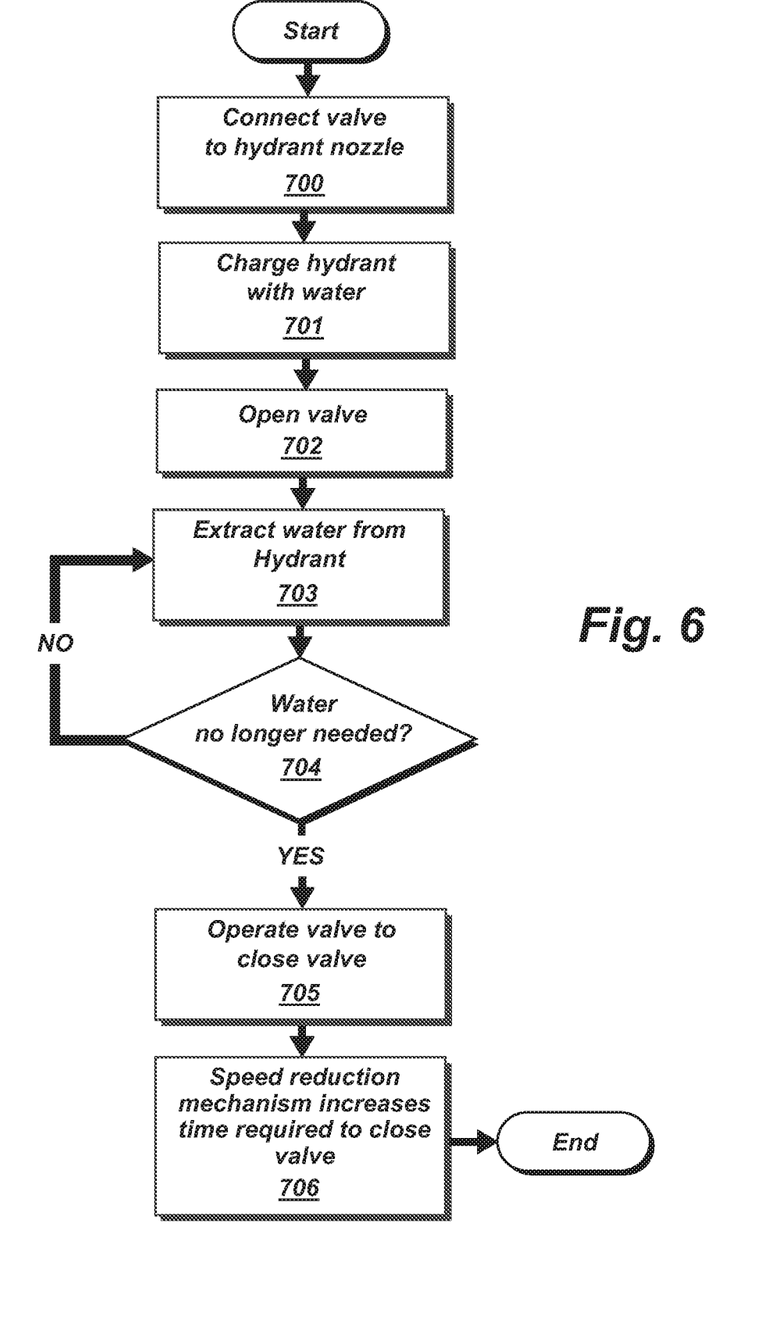
FIG. 6 is a flowchart illustrating a method for water hammer prevention according to principles described herein.

FIG. 6 is a flowchart illustrating a method for water hammer prevention according to principles described herein. As shown in FIG. 6, the illustrative method shown is for extracting water from a fire hydrant using a valve attached to a nozzle of the hydrant.

First, if not already connected or integrated into the hydrant, a valve is connected to a nozzle of the hydrant (step 700). The hydrant can then be charged with water (step 701) by opening the main hydrant valve (103, FIG. 1).

Once the valve is in place and the hydrant is charged, the valve can be opened (step 702) to extract water from the hydrant. As described above, water may be extracted, for example, to fill a tanker for construction, fire fighting, irrigation or any of a number of other purposes. With the valve open, water is extracted from the hydrant (step 703).

When the need for water has been filled (determination 704), whatever that need is, the valve can be closed to discontinue the flow of water. As described in detail above, if the valve is closed too quickly, water hammer may occur and potentially damage the water system infrastructure, the hydrant, equipment connected to the hydrant and/or surrounding property.

When it is time to close the valve (determination 704), the closure mechanism of the valve is operated (step 705). This may be a valve gate, butterfly member or ball member, depending on the type of valve being used.

As described herein, a speed reduction mechanism is operated when the closure mechanism of the valve is operated (step 706). This speed reduction mechanism will limit how quickly the valve can be closed and increase the time required to close the valve to prevent water hammer. As described above, the speed reduction mechanism will incorporate one or more devices such as a gear train or a torque control/slippage device that will limit how quickly the valve can be closed and increase the time required to close the valve to prevent water hammer.

The valve and the principles described herein can be applied to any valve in any water or other fluid line. For example, the described valve may be permanently installed in any water line. The described valve may also be installed in a line carrying petroleum or any fluid under pressure that might experience a dangerous water or fluid hammer effect if the valve is closed too rapidly.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A valve for preventing a fluid hammer effect, said valve comprising:
   a gate valve having a gate that is translated in and out of a channel of the valve by rotation of a valve handle; and
   a speed reduction device for reducing a speed at which said valve may be closed, the speed reduction device comprising a gear train with a gear ratio such that a number of rotations of said valve handle results in a lesser number of rotations of a screw that translates said gate with respect to said channel;
   wherein the gear train comprises at least three gears such that, a first two gears in the gear train reverse a direction of rotation of the valve handle as applied to a third gear, the third gear again reversing a direction of rotation applied to the screw so that a clockwise rotation of the handle will close the gate and a counter-clockwise rotation of the handle will open the gate;
   wherein each of the three gears is a round gear with teeth around an outer periphery thereof.

2. The valve of claim 1, further comprising a set of threads at one end of the channel sized for mating with the threads of a pumper nozzle of a fire hydrant.

3. The valve of claim 2, further comprising a set of threads at an opposite end of the channel sized for mating with a hose of a water truck.

4. The valve of claim 1, wherein the screw comprises a worm gear.

5. The valve of claim 1, wherein the gear train consists of three gears.

6. A method of operating the valve of claim 1 for preventing a fluid hammer effect, the method comprising:
   connecting the valve to a fire hydrant;
   closing the valve at the fire hydrant after extracting water from said fire hydrant;
   wherein the valve comprising the speed reduction device that increases an amount of time needed for closing said valve, and operating said valve to close said valve comprises operating the speed reduction device such that said increased amount of time needed for closing said valve prevents an occurrence of fluid hammer associated with said closing of said valve;
   wherein the speed reduction device for reducing a speed at which said valve may be closed comprising the gear train has the gear ratio such that a number of rotations of said valve handle results in a lesser number of rotations of a screw that translates said gate with respect to said channel.

7. The method of claim 6, further comprising using a set of threads at one end of the channel sized for mating with the threads of a pumper nozzle of a fire hydrant.

8. The method of claim 7, further comprising using a set of threads at an opposite end of the channel sized for mating with a hose of a water truck.

9. The method of claim 6, wherein the screw comprises a worm gear.

10. A method of operating the valve of claim 1 for preventing a fluid hammer effect comprising, with said three gears of the gear train:
    increasing an amount of time needed for closing said valve; and
    preventing said fluid hammer effect by decreasing a rate at which said valve is closed.

11. The method of claim 10, wherein the gear train consists of three gears.

12. The method of claim 10, further comprising using the valve as an integral part of a waterline.

13. The method of claim 10, further comprising using the valve in a line carrying petroleum.

14. The method of claim 10, further comprising using the valve in a line carrying fluid under pressure.

15. A valve for preventing a fluid hammer effect, said valve comprising:
    a gate valve having a gate that is translated in and out of a channel of the valve by rotation of a valve handle; and
    a speed reduction device for reducing a speed at which said valve may be closed, the speed reduction device comprising a gear train with a gear ratio such that a number of rotations of said valve handle results in a lesser number of rotations of a screw that translates said gate with respect to said channel;
    wherein the gear train comprises at least three gears such that, a first two gears in the gear train reverse a direction of rotation of the valve handle as applied to a third gear, the third gear again reversing a direction of rotation applied to the screw so that a clockwise rotation of the handle will close the gate and a counter-clockwise rotation of the handle will open the gate;
    wherein a gear ratio between the second and third gears is 1:1.

16. The valve of claim 15, wherein each of the three gears is a round gear with teeth around an outer periphery thereof.

\* \* \* \* \*